United States Patent
Han et al.

(10) Patent No.: US 6,266,474 B1
(45) Date of Patent: Jul. 24, 2001

(54) DUAL FIBER COLLIMATOR OPTICAL VARIABLE ATTENUATOR

(75) Inventors: Naiqian Han, Sunnyvale; Zhongming Mao, Santa Clara, both of CA (US)

(73) Assignee: Alliance Fiber Optics Products, Inc., Sunnyvale, CA (US)

(*) Notice: Subject to any disclaimer, the term of this patent is extended or adjusted under 35 U.S.C. 154(b) by 0 days.

(21) Appl. No.: 09/255,915

(22) Filed: Feb. 23, 1999

(51) Int. Cl.[7] ........................................ G02B 6/32
(52) U.S. Cl. ........................ 385/140; 385/11; 385/33
(58) Field of Search .................... 385/31, 11, 33–35, 385/38, 39, 42, 48, 140

(56) References Cited

U.S. PATENT DOCUMENTS 5,805,759 * 9/1998 Fukushima ............................ 385/140
6,130,984 * 10/2000 Shen et al. ............................ 385/140

* cited by examiner

*Primary Examiner*—John D. Lee
*Assistant Examiner*—Michelle R. Connelly Cushwa
(74) *Attorney, Agent, or Firm*—Wei Te Chung

(57) ABSTRACT

A dual fiber collimator (16) is provided in front of the neutral density (ND) filter (22) with a first fiber (18) and a second fiber (20) extending therefrom wherein the ND filter (22) is of a wedge configuration for eliminating oscillation thereof. A compensation lens (28) is positioned between the ND filter (22) and the collimator (16) for lowering the PDL of the attenuator (10).

9 Claims, 2 Drawing Sheets

DUAL FIBER COLLIMATOR OPTICAL VARIABLE ATTENUATOR

BACKGROUND OF THE INVENTION

1. Field of The Invention

The invention relates to the optical variable attenuator used in optical fiber communication system and optical network technology, and particularly to the dual fiber collimator for use therewith.

2. The Prior Art

As well known, optic attenuators are widely used in the optical transmission system and the optical network, and especially in the optical wavelength division multiplexing (WDM) network, which closely relates to "Project of Information Highway". The fiber optic attenuator is a passive optical component that is intended to reduce the optical power propagating in the fiber, and may be categorized to either a fixed or a variable attenuator, wherein the variable attenuator is deemed as an optimal one. The motor driven optical variable attenuator (OVA) is a new kind of device used in the WDM network, which can optionally control the receiving power to be at one certain level, so the performance of the network can be greatly improved with an expected value. Though OVA is deemed very usefully, there is less patents relates thereto. For example, U.S. Pat. No. 5,745,634 ('634) uses two lenses to design the optics coupling system and uses the normal DC motor to control motion, thus resulting in at least two disadvantages including unstability of the performance and the expensive price. In '634, the mechanical system thereof uses two gears to transfer the non-precision motion to the precision motion whereby it is uneasy to improve the tuning speed thereof.

Therefore, it is desired to have an optical variable attenuator with simple structures thereof and high reliable precise performance. Anyhow, the application Ser. No. 09/174,367 filed Oct. 15, 1998, now U.S. Pat. No. 6,144,794, discloses using a step motor with the lead screw and the corresponding nut to transform the rotation movement to the linear movement from the mechanical system viewpoint thereof whereby a neutral density (ND) filter can be linearly moved between two opposite collimators for performing a variable attenuator form the optical system viewpoint thereof.

It should be understood that oscillation is derived from interference coming from the two faces of the ND filter. Suppose that the reflection rates of such two faces of the filter are 99% and 1%, respectively, the transverse area of the light beam is large enough as shown in FIG. 2 wherein there is oscillation in the attenuation spectrum. Moreover, the return loss of a high quality OVA should be designed as high as 55 dB. Thus, in the two-collimator system of the copending application Ser. No. 09/174,367, the ND filter should be placed with a declination to purposely enlarge the return loss. While unfortunately this declination arrangement also enlarges the undesired insertion loss. As practiced in the aforementioned copending application Ser. No. 09/174,367, a wedge glass is introduced to provided a designed declination thereby resulting in not only the required 55 dB return loss but also the diffraction for restricting the resonance or the insertion loss thereof. Understandably, if the second collimator can not precisely and correctly received the expected light beam from the first collimator, the attenuation effect will be jeopardized.

Additionally, there are also some disadvantages in mechanism of the copending application. Because the slide used therein is a very expensive device and its mass is fairly large. Oppositely, the step motor can only afford limited torque, so that the tuning speed can not be very high; otherwise, the motor will lose steps, and cause trouble in setting of attenuation and result in bad repeatability performance. By using the slide, the turning speed more than 500 ms is not allowed for the whole attenuation range, while without the slide, the high precision motion direction might be worse.

Therefore, corresponding to the aforementioned optical viewpoint, an object of the invention is to provide a variable attenuator which uses a wedge type filter to cooperate with a dual-fiber collimator to provide declination thereof and precisely transmit the light beam therebetween, thus maintaining the return loss as high as 55 dB while without oscillation or significant insertion loss thereof from the optical viewpoint.

Corresponding to the aforementioned mechanical viewpoint, another object of the invention is to provide a variable attenuator with simplified structures which may meet the high turning speed of the operation requirements from the mechanical viewpoint.

Yet a third object of the invention is to provide the variable attenuator with a low polarization dependent loss (PDL). It should be noted that since the attenuation designedly changes 20 dB along the 4 mm length of the filter, the filtering coating on the ND filter forms a very tiny wedge layer on the glass plate and makes the ND filter a polarization dependent device. Generally, the PDL of such a ND filter is more than 0.3 dB. This value is deemed too large and is desired to be lowered to be less than 0.1 dB.

SUMMARY OF THE INVENTION

According to an optical aspect of the invention, a dual fiber collimator is provided in front of the neutral density (ND) filter with a first fiber and a second fiber extending therefrom wherein the ND filter is of a wedge glass for eliminating oscillation thereof. A compensation lens is positioned between the ND filter and the collimator for lowering the PDL of the attenuator.

According to a mechanical aspect of the invention, a linking pin is respectively supportably connected, at two ends, by a pair of guide pins and a nut which is actuated to linearly move by a rotatably moving lead screw.

DETAILED DESCRIPTION OF THE PREFERRED EMBODIMENTS

References will now be in detail to the preferred embodiments of the invention. While the present invention has been described with reference to the specific embodiments, the description is illustrative of the invention and is not to be construed as limiting the invention. Various modifications to the present invention can be made to the preferred embodiments by those skilled in the art without departing form the true spirit and scope of the invention as defined by appended claims.

Figure 1:
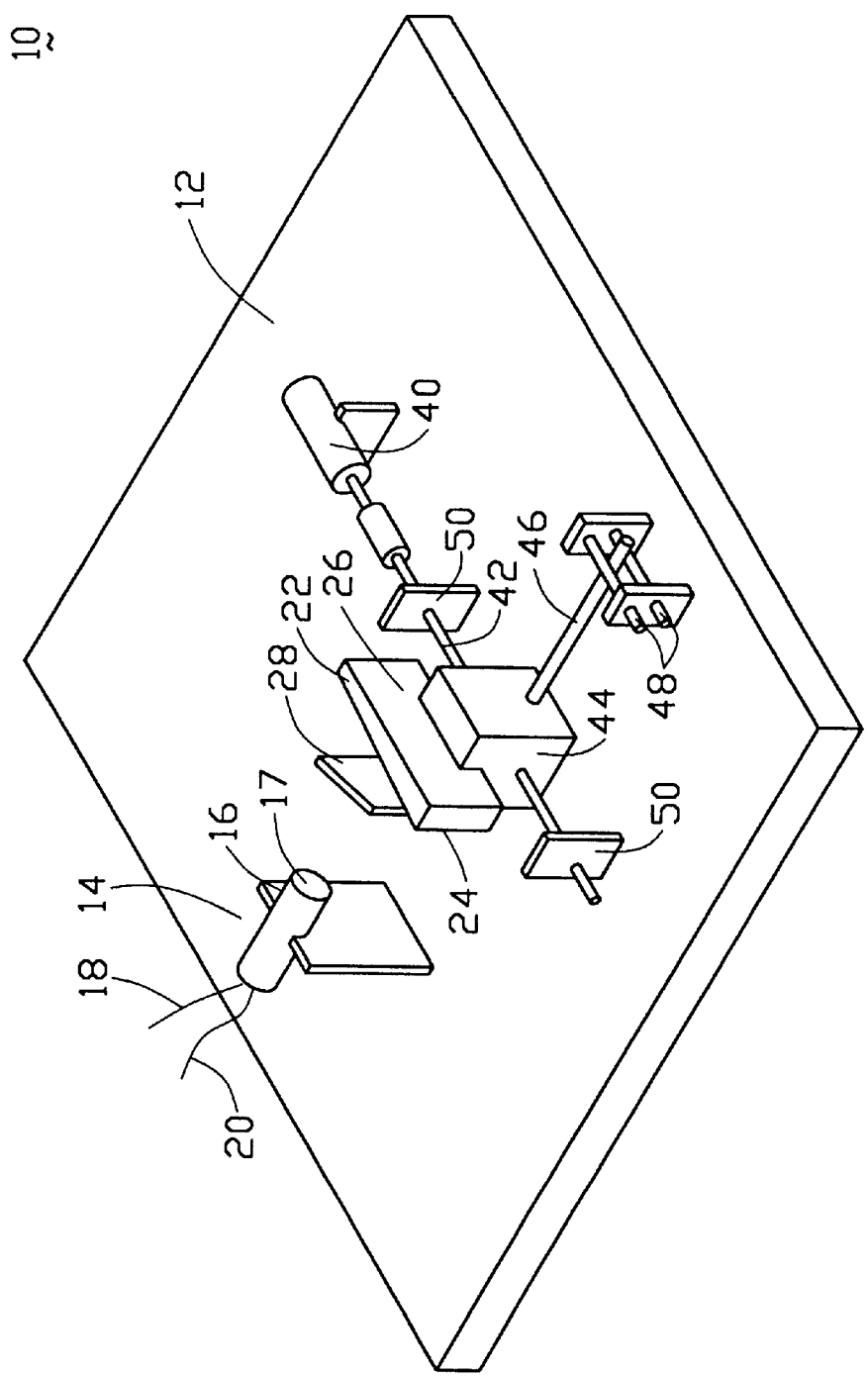
FIG. 1 shows a preferred embodiment of an optical variable attenuator according to the invention.

It will be noted here that for a better understanding, most of like components are designated by like reference numerals throughout the various figures in the embodiments. Attention is directed to FIG. 1 wherein the attenuator 10 includes a mechanical actuation system 12 and an optical attenuation system 14. The optical attenuation system 14 includes a dual fiber collimator 16 defining a coaxial axis and comprising a grin lens 17 with first fiber 18 as an input end and a second fiber 20 as an output end, and a neutral density filter 22 with the variable thickness filter coating accompanying a high reflection layer on the first surface of the first face 24 facing the collimator 16 and a wedge or declination surface on the second face 26. A compensation lens 28 is provided between the filter 22 and the collimator 16.

It can be seen that the light beam/signal goes into the first fiber 18, out of the grin lens 17 and hits the filter 22, and then reflects back through the grin lens 17 back to the second fiber 20 and leaves the attenuator 10. Because the filter 22 may be linearly moved by the mechanical system 12, thus varying attenuation thereof. Also, because a wedge configuration is provided on the second face 26, the reflected light signal occurring thereabout will go away in another divergent direction away from the first face 24 and the collimator 16, and thus will not go back through the first face 24 thereby not interfering with the reflected light signal occurring around the first face 24. Accordingly, no oscillation will occur. It is appreciated that the wedge configuration on the second face 26 of the filter 16, may be replaced by a ground glass surface parallel with the surface on the first face 24.

The filter 22 is a polarization dependent device due to its filter coating and has a PDL over 0.3 dB which is desired to be lowered to be under 0.1 dB or even 0.05 dB wherein the PDL is caused by the difference of P light and S light after passing the filter 22. P light and S light will be explained later. The compensation lens 28 is designedly disposed between the filter 26 and the collimator 16 with the designed dimensions and an angular position with regard to the corresponding filter 22 for lowering the PDL of the transmitted light. The compensation lens 28 generally includes a pair of parallel side interface planes 1, 2 and intentionally disposed with a designed angle with regard to the filter 22.

Figure 2:
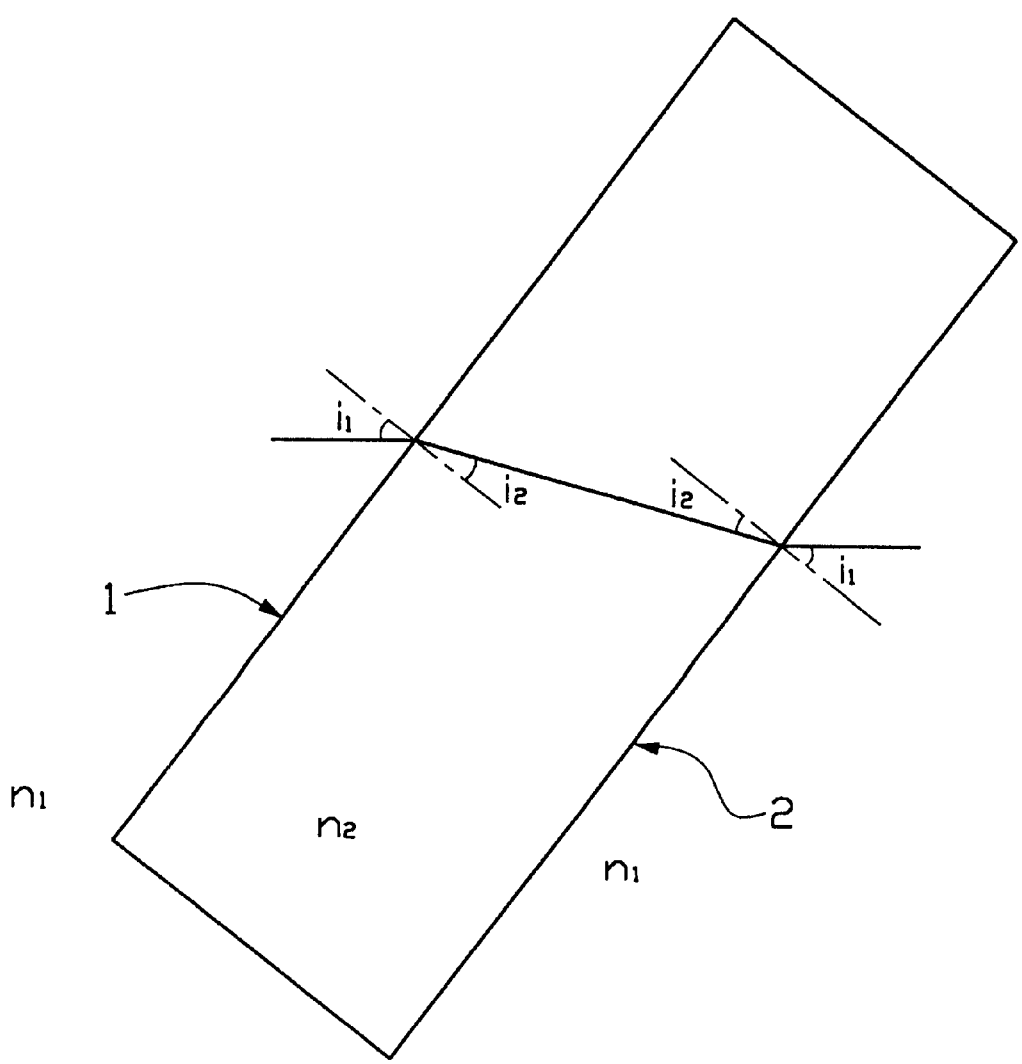
FIG. 2 shows the tilted compensation lens with regard to the light penetrates therethrough.

FIG. 2 shows a light passes the tilted compensation lens 28 wherein $n_1$ is the refractive index of the air, $n_2$ is the refractive index of the compensation lens 28, $i_1$ is the incident angle form the air to the compensation lens 28, $i_2$ is the refraction angle form the air to the compensation lens 28, $t_p$ and $t_s$ are respectively the transmission rates of P light (the polarized light signal with DOP (direction of polarization) perpendicular to the plane constituted by the normal plane including the incident ray) and of S light (the polarized light signal with DOP (direction of polarization) parallel to the same plane).

Under this condition, $t_p = t_{p1} * t_{p2} = (2n_1 \cos_{i_1}/(n_2 \cos_{i_1} + n_1 \cos_{i_2})) * (2n_2 \cos_{i_2}/(n_1 \cos_{i_2} + n_2 \cos_{i_1}))$ wherein $t_p$ is the total transmission rate through the interface plane 1 and 2, $t_{p1}$ is the transmission rate of P light through interface plane 1 and $t_{p2}$ is the transmission rate of P light through interface plane 2. Because $n_1 = 1$ (in the air) and $n_2$ is represented by n, then $t_p = (2\cos_{i_1}/(n\cos_{i_1} + \cos_{i_2})) * (2n\cos_{i_2}/(\cos_{i_2} + n\cos_{i_1})) = 4n\cos_{i_1}\cos_{i_2}/((n\cos_{i_1} + \cos_{i_2}) * (\cos_{i_2} + n\cos_{i_1}))$. Similarly, for S light, $t_s = t_{s1} * t_{s2} = (2n_1 \cos_{i_1}/(n_1 \cos_{i_1} + n_2 \cos_{i_2})) * (2n_2 \cos_{i_2}/(n_2 \cos_{i_2} + n_1 \cos_{i_1})) = 4\cos_{i_1}\cos_{i_2}/((\cos_{i_1} + n\cos_{i_2}) * (n\cos_{i_2} + \cos_{i_1}))$. Thus, $t_p/t_s = ((n\cos_{i_2} + \cos_{i_1})/(n\cos_{i_1} + \cos_{i_2}))^2$. According to Fenel Law, $n\sin_{i_2} = \sin_{i_1}$, then $t_p/t_s \neq 1$ if $i_1 \neq 0$. Therefore, it is proved that the tilted compensation lens 28 functions as a polarization dependent device. In opposite, if $i_1 = 0$ (i.e., no tilting of the lens 28), then $i_2 = 0$, and $t_p/t_s = 1$. Under this situation, such a compensation lens 28 is not a polarization dependent device.

Accordingly, the tilted compensation lens 28 is polarization dependent device, and is intentionally used and configured to compensate for the PDL of the ND filter 22. The theory is illustrated below.

Suppose the filter 22 has the character that P light experiences less loss of the power while S light experiences more. To make P light lose the same amount as S light, the compensation lens 28 has the character that P light experiences more loss and S light experiences less, even though the lens 28 is also with the large PDL performance similar to the filter 22. As a result, after passing both the lens 28 and the filter 22, P light may experience the same amount of power loss as S light, thus lowering the PDL of the light signal. Generally, after compensation, the PDL can be as low as 0.03 dB.

The above portion illustrates the optical attenuation system 12 which uses the dual fiber collimator 16 with two in-and-out fibers 18, 20 to cooperate with the wedge filter 22 for easily obtaining the high return loss without oscillation phenomena thereof. Moreover, the compensation lens 28 between the filter 22 and the collimator 16, which generally owns some opposite characters to the filter 22. may cooperate with the filter 22 to efficiently lower the PDL, thus assuring the attenuator's quality thereof.

On the other hand, the mechanical attenuation system 12 includes the step motor 40 which rotates a lead screw 42 to actuate a nut 44 to move linearly. A link pin 46 is connected to the nut 44 and a pair of parallel guiding pins 48 are positioned by two sides thereof about the distal end of the link pin 46 in place of the slide used in the aforementioned previous copending application. It is also noted that the filter 22 is assembled to the nut 44 instead of to the slide used in the previous application.

FIG. 1 shows the basic structural relationship among the lead screw 42, the nut 44, link pin 46 and the guiding pins 48. Generally speaking the angle tolerance in X direction is limited by the nut 44, the lead screw 42, and link pin 46 and the guide pins 48. The angle tolerance in Z direction is neglectably small. The position tolerance in both X and Y directions can be neglected. The position tolerance in Z direction is limited by the nut 44, the lead screw 42 and two bearings 50.

According to the mechanical theory, several approaches may be taken to optimize the mechanical operation.
(1) The diameter should be small. The smaller the diameter is the less torque it needs. Additionally, the small diameter lowers the contact area of the nut and the lead screw, so that the friction is small, thus enhancing the reliability thereof.
(2) The length of the link pin should be short.
(3) The friction coefficient between the link pin and the guide should be small.
(4) The friction coefficient between the nut and the lead screw should be small. The little coefficient brings less resistance torque, so that the step motor can easily actuate the mechanical system.
(5) The mass center should be at the center of the lead screw. Under this situation, the torque caused by gravity is zero.

By following these principles, the OVA may have designed good performances.

In conclusion, the invention provides not only the improved optical attenuation system but also the improved mechanical actuation system for achieving an optical variable attenuator (OVA) which includes a simplified structure while with a better performance than the prior art.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. A dual fiber collimator optical variable attenuator, comprising:

an optical attenuation system including:

a dual fiber attenuator including a grin lens with a first fiber as an input end and a second fiber as an output end; and a neutral density filter with variable thickness coating thereon; wherein a compensation lens is positioned between the collimator and the filter and functions as a polarization dependent device for achieving a low polarization dependent loss.

2. The attenuator as described in claim 1, wherein said coating is applied to a first surface facing to said collimator.

3. The attenuator as described in claim 1, wherein said filter includes a wedge configuration or ground glass on a second surface opposite to said first surface.

4. The attenuator as described in claim 1, wherein said filter is perpendicularly moved with regard to an axis of said collimator.

5. The attenuator as described in claim 1, wherein said compensation lens includes a pair of parallel side planes both tilted with regard to an axis of the collimator.

6. A dual fiber attenuator comprising:

an optical attenuation system including a dual fiber collimator cooperating with a linearly moveable filter with variable attenuation thereof;

a mechanical actuation system for linearly moving said filter relative to said collimator; wherein a compensation lens is positioned between said collimator and said filter and functions as a polarization dependent device for achieving a low polarization dependent loss.

7. The dual fiber attenuator as described in claim 6, wherein said filter defines a wedge configuration on a surface opposite to another surface thereof facing said collimator.

8. The attenuator as described in claim 7, wherein said compensation lens includes a pair of parallel side planes both tilted with regard to a linearly moving direction of said filter.

9. The attenuator as described in claim 6, wherein said mechanical actuation system includes a link pin of which, one end is connected to a nut and another end is supported by at least one guiding pin.

* * * * *